United States Patent
Pfeifer

(10) Patent No.: US 10,281,029 B2
(45) Date of Patent: May 7, 2019

(54) SENSOR DEVICE FOR SENSING A SELECTOR LEVER POSITION AND SELECTOR LEVER DEVICE FOR A MOTOR VEHICLE

(71) Applicant: ZF Friedrichshafen AG, Friedrichshafen (DE)

(72) Inventor: Ralf Pfeifer, Diepholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 61 days.

(21) Appl. No.: 15/555,035

(22) PCT Filed: Feb. 11, 2016

(86) PCT No.: PCT/EP2016/052867
§ 371 (c)(1),
(2) Date: Aug. 31, 2017

(87) PCT Pub. No.: WO2016/139037
PCT Pub. Date: Sep. 9, 2016

(65) Prior Publication Data
US 2018/0038477 A1  Feb. 8, 2018

(30) Foreign Application Priority Data

Mar. 3, 2015 (DE) .................. 10 2015 203 752

(51) Int. Cl.
*F16H 59/02* (2006.01)
*F16H 59/10* (2006.01)
(Continued)

(52) U.S. Cl.
CPC ....... *F16H 59/105* (2013.01); *F16H 59/0204* (2013.01); *F16H 61/12* (2013.01);
(Continued)

(58) Field of Classification Search
CPC ..................................................... F16H 59/105
See application file for complete search history.

(56) References Cited

U.S. PATENT DOCUMENTS 3,725,904 A * 4/1973 Breslow .................. H03M 1/00
250/570
6,353,399 B1 * 3/2002 Prakash .............. H03M 1/1076
341/10
(Continued)

FOREIGN PATENT DOCUMENTS

DE        198 52 227 A1   5/2000
DE   10 2011 088 365 A1   6/2013
(Continued)

OTHER PUBLICATIONS

International Search Report and Written Opinion of the International Search Authority dated Apr. 29, 2016 in International Application No. PCT/EP2015/052867 (English and German languages) (13 pp.).

(Continued)

*Primary Examiner* — Derek D Knight
(74) *Attorney, Agent, or Firm* — Brinks Gilson & Lione

(57) ABSTRACT

In one general aspect, the present disclosure is related to a sensor device for detecting selector lever positions of a selector lever for a motor vehicle. The sensor device may include at least four sensors and a code carrier, where the code carrier is arranged such that it is faced by the at least four sensors. The code carrier may be movable with respect to the at least four sensors. The code carrier may be attached to the selector lever. The code carrier may include several coding areas each with an encoding. The code carrier can thus be referred to as coding carrier. The encoding of the individual coding areas can be read by using the sensors.

14 Claims, 4 Drawing Sheets

(51) Int. Cl.
    *G01D 5/244* (2006.01)
    *F16H 61/12* (2010.01)
    *G01D 5/249* (2006.01)

(52) U.S. Cl.
    CPC ......... *G01D 5/249* (2013.01); *G01D 5/24438* (2013.01); *G01D 5/24457* (2013.01); *G01D 5/24485* (2013.01); *F16H 2061/1256* (2013.01)

(56) References Cited

U.S. PATENT DOCUMENTS

| | | | |
|---|---|---|---|
| 6,376,929 B1 * | 4/2002 | Nakajima | F16H 59/105 |
| | | | 307/10.1 |
| 6,469,642 B1 * | 10/2002 | Kreppold | F16H 59/105 |
| | | | 200/6 A |
| 2010/0085082 A1 | 4/2010 | Katrak | |

FOREIGN PATENT DOCUMENTS

| | | |
|---|---|---|
| DE | 10 2012 206 417 A1 | 10/2013 |
| DE | 10 2013 223 617 A1 | 5/2015 |
| EP | 1 750 039 A1 | 2/2007 |
| WO | WO 2010/112082 A1 | 10/2010 |

OTHER PUBLICATIONS

Search Report dated Nov. 4, 2015 for German Patent Application No. 10 2015 203 752.5, (10 pp.), note: pp. 1 and 2 are English language Explanations to Section C. Result of Determination Document.

* cited by examiner

| Pos | Sensor-Ausgabe je WH-Position | |
|---|---|---|
| | ①②③④ | ⑤⑥ |
| alle 0 | 0 0 0 0 | 0 0 |
| P4 | 0 0 1 1 | 0 0 |
| P3 | 0 1 1 0 | 0 1 |
| P0 | 0 1 0 1 | 1 0 |
| P1 | 1 0 1 0 | 1 0 |
| P2 | 1 1 0 0 | 0 0 |
| alle 1 | 1 1 1 1 | 1 1 |

Fig. 5

| 4 Sensoren | | 0000 | 0011 | 0110 | 0101 | 1010 | 1100 | 1111 |
|---|---|---|---|---|---|---|---|---|
| (alle an) | 0000 | | 2 | 2 | 2 | 2 | 2 | 4 |
| P4 | 0011 | 2 | | 2 | 2 | 2 | 4 | 2 |
| P3 | 0110 | 2 | 2 | | 2 | 2 | 2 | 2 |
| P0 | 0101 | 2 | 2 | 2 | | 4 | 2 | 2 |
| P1 | 1010 | 2 | 2 | 2 | 4 | | 2 | 2 |
| P2 | 1100 | 2 | 4 | 2 | 2 | 2 | | 2 |
| (alle aus) | 1111 | 4 | 2 | 2 | 2 | 2 | 2 | |

Fig. 6

| 6 Sensoren | | 000000 | 001100 | 011001 | 010110 | 101010 | 110000 | 111111 |
|---|---|---|---|---|---|---|---|---|
| (alle an) | 000000 | | 2 | 3 | 3 | 3 | 2 | 6 |
| P4 | 001100 | 2 | | 3 | 3 | 3 | 4 | 4 |
| P3 | 011001 | 3 | 3 | | 4 | 4 | 3 | 3 |
| P0 | 010110 | 3 | 3 | 4 | | 4 | 3 | 3 |
| P1 | 101010 | 3 | 3 | 4 | 4 | | 3 | 3 |
| P2 | 110000 | 2 | 4 | 3 | 3 | 3 | | 4 |
| (alle aus) | 111111 | 6 | 4 | 3 | 3 | 3 | 4 | |

Fig. 7

SENSOR DEVICE FOR SENSING A
SELECTOR LEVER POSITION AND
SELECTOR LEVER DEVICE FOR A MOTOR
VEHICLE

CROSS REFERENCE TO RELATED APPLICATIONS

This application is a filing under 35 U.S.C. § 371 of International Patent Application PCT/EP2016/052867, filed Feb. 11, 2016, and claims the priority of German Patent Application 10 2015 203 752.5, filed Mar. 3, 2015.

TECHNICAL FIELD

The present disclosure relates to a sensor device for detecting selector lever positions of a selector lever for a motor vehicle and a selector lever device for a motor vehicle comprising such a sensor device.

BACKGROUND

The document DE 10 2011 088 365 A1 discloses a sensor device to detect selector lever positions comprising a magnetic disc-shaped code carrier with differently magnetized coding areas, wherein the code carrier can be arranged relatively movable towards stationary hall sensors arranged strung along a line or arranged carried along movably on a selector lever. The code carrier and the hall sensors are arranged to each other such that the hall sensors, in any predetermined position of the code carrier that corresponds to a selection lever position of the selector lever to be detected, can read out opposite coding areas and can provide them as a sensor signal. Depending on their magnetizing, the encodings of the magnetized coding areas are emitted by the hall sensor with a sensor signal value "1" and "0", by which each of the hall sensors depicts a binary sensor. The read out sensor signal values "0" and "1" are referred to as alphabet in the coding theory. By means of four hall sensors, 16 different conditions can be represented as a 4-bit signal word or signal code accordingly, of which selected signal codes can be assignable to a selector lever position of the selector level to be detected. Specific requirements are therefore imposed on signal codes of successive selector lever positions, particularly to diagnose the functionality of individual sensors, which are fulfilled across the so-called Hamming distance, in particular. If a minimal Hamming distance of two is required to recognize a single fault, for example, each signal code assigned to a selector lever position should differ in at least two characters from each of the other valid signal codes.

With that said, the embodiments of the present disclosure accomplishes an improved sensor device for detecting a selector lever position and an improved selector lever device for a motor vehicle comprising such a sensor device according to the main claims. By means of the suggested sensor device, an improved diagnostic option shall be provided, wherein the sensor device can be designed compact and enables a reliable detecting of the selector lever positions, particularly in case of defect of one of the sensors used for detecting the selector lever positions. Advantageous designs arise from the dependent claims and the following description.

BRIEF SUMMARY

The present approach is based on the realization that an especially reliable evaluation of a sensor function can be performed on two signal codes during an operation of the sensor device, if signal codes of successive positions to be detected have a Hamming distance of at least four. It is advantageous if one of the positions is a starting position that the sensor device is at during the start of operation of the sensor device, and that the following position is one of the menu options, which follows the starting position in the order of the positions to be detected. A defect of the sensors from the sensor device can thus be recognized reliably and easily and can be evaluated and preferably signalized using the evaluator coupled with the sensors. The evaluator can preferably be part of the sensor device or alternatively preferred of a control device, which is or can be coupled with the respective sensors.

The embodiments of the present disclosure are preferably suited for selector levers used in motor vehicles. The selector lever can be a gear selector lever that is usually placed in a center console of the motor vehicle to select drive positions of a vehicle transmission. The selector lever can furthermore be a control stalk that is arranged on a steering column, wherein such a control stalk is used for the most various functions in the motor vehicle in the meantime. For example, the control stalk can be configured as a gear selector lever, an indicator lever, a windscreen wiper lever, or as part of a speed control device. It is furthermore preferred if the selector lever has a monostable or bistable (or bi-stable) design. A monostable construction is to be understood as an automatic resetting of the selector lever from an unstable selector lever position to a stable selector position as soon as the selector lever is released in the unstable selector lever position. The selector lever device can thus be designed such that the selector lever has at least one stable selector lever position and several unstable selector lever positions, particularly per selector lever shifting gate. A bistable construction is to be understood as a stopping or remaining of the selector lever in each of the selector lever positions. Such a selector lever can be designed for automated or automatic transmissions of motor vehicles and further preferred for shift-by-wire motor vehicle transmissions.

The present disclosure proposes a sensor device for detecting selector lever positions of a selector lever for a motor vehicle. The sensor device comprises at least four sensors and a code carrier which is arranged opposite the at least four sensors and which is movable relative to them. The code carrier can be arranged on the selector lever whereby the code carrier of the selector lever is adapted to move in a constrained fashion. The code carrier comprises several coding areas each with a predetermined coding. The code carrier can thus be referred to as coding carrier. The coding of the individual coding areas can be realized by means of a physical phenomenon. The coding can be realized by means of magnetizing, a magnetizing device, an electrical property such as a different capacity or inductance, an optical property such as reflexivity or transmissivity, or a mechanical property.

Depending on the realization of the coding of the code carrier, each of the at least four sensors are devices that are able to read out the coding of the respective coding areas from the code carrier and to provide it as a sensor signal. A coding of the individual coding areas can preferably be realized by means of magnetizing, for example, where a polarity of the magnetization represents a predetermined coding. Accordingly, the coding of a coding area can be realized by a positive magnetization or alternately a negative magnetization. A positive or negative magnetization can be supplemented or combined with a field-free coding area. The coding area can thus have one of at least two possible predetermined encodings.

With such a coding, the at least four sensors can be configured to detect the coding of the respective coding area utilizing the Hall Effect to determine a negative magnetization and supplementary or alternatively a positive magnetization and supplementary or alternatively a field-free coding area. Such sensors are known as Hall sensors. A positive magnetization can be understood as a magnetization as North Pole or South Pole, and a negative magnetization can be understood as a magnetization as South Pole or North Pole.

Alternatively, in case of a coding based on inductance, the at least four sensors can be designed as inductive sensors. As another alternative, in case of a coding based on capacity, the at least four sensors can be designed as capacitive sensors. As a third alternative, the at least four sensors can be optical couplers, where the optical coupler can be designed as an optical reflex coupler and supplementary or alternatively as an optical coupler according to the transmitted light principle.

The code carrier and the at least four sensors are arranged to each other such that a coding area faces each sensor in every predetermined position of the code carrier provided for detecting a selector lever position, each sensor of the at least four sensors being designed to provide the coding of the opposite coding area and to provide it as a sensor signal. A sensor code can thus be formed from the respective provided sensor signal, which can be assigned to the predetermined position of the code carrier. The sensor code can thus be understood as a sensor word that preferably has the same number of entries as the number of sensors. It is essential for certain embodiments of the present disclosure that the sensor code can be formed from sensor signals of the at least four sensors to be able to ensure a Hamming distance of four between two signal codes. Which sensor fills which entry of the sensor code depends on a sensor sequence of the at least four sensors, wherein the sensor sequence is preferably freely selectable.

Embodiments of the present disclosure are characterized by the fact that the coding areas of the code carrier are divided on least two tracks which extend to each other in parallel, wherein the at least four sensors and the coding areas with the respective predetermined encodings are arranged to each other such that a first sensor code to be provided, which is assigned to a starting position of the code carrier, is assigned to a second sensor code to be provided, which is assigned to another position of the code carrier, which then follows in sequence of the predetermined positions of the code carrier from the initial position, has a Hamming distance of four. A most reliable detection of a defect of one of the sensors can already be ensured when starting to use the selector lever. This enables an early warning of a defect ensuring a safe condition of the device comprising the sensor device. A safety device can thus be provided, which can be assigned to the sensor device or which is or can be coupled with the sensor device. The safety device can be an evaluator or a control device, for example. Generally speaking, a functional safety of the selector lever for the motor vehicle can thus be increased. The use of the at least two-track code carrier furthermore enables a denser arrangement of the sensors whereby the sensor device can be designed compact. Inexpensive and customary binary sensors can furthermore be used, wherein a binary sensor is to be understood as a sensor configured to read out two different encodings and to emit them as different sensor signals.

The coding areas of the code carrier preferably have a similar construction design, even more preferably an identical dimension. The code carrier can thus be constructed easily and be designed cost-effectively.

The code carrier is preferably formed from a disc or a plate shaped like a ring segment. A circular arc underlying the ring-segment design can preferably be designed adaptable to a range of motion of the selector lever, wherein the range of motion reaches from a rotary axis to a place of the arrangement of the code carrier on the selector lever. Both the coding areas and the sensors can be arranged relative to a rotary axis of the selector level or the code carrier on a circular arc corresponding to the motion axis of the selector lever and can be aligned optimally to one another. It is further preferred if the individual coding areas form a partial ring segment each. A more space-saving arrangement of the coding areas and a compact design of the code carrier can thus be enabled.

The coding area from the one track furthermore preferably borders the coding areas of the other track. The coding areas from the one track are furthermore preferably offset to the coding areas of the other track. The sensors cannot just be arranged close to each other, but also offset to each other to further reduce a size of the code carrier. Furthermore, a higher accuracy can be achieved. In particular, the size of the sensors can be a limiting factor for a miniaturization of the code carrier, which can be effectively addressed by providing the code carrier with another, or rather a second or third track with coding areas, thus enabling a further miniaturization of the code carrier.

According to one preferred embodiment, the sensor device comprises four sensors. In other words, due to the specific arrangement and coding during a position change of the code carrier from the starting position to the other position and also vice versa, the four sensors perform a change of the sensor signal. A faulty sensor can be recognized from the four sensors already after taking up two different positions.

Further preferred, the encodings of the coding areas from the code carrier and the four sensors are provided such that the sensor codes of the predetermined positions of the code carrier intended to detect the selector lever positions have a Hamming distance of at least two among each other. Both, a defect of an individual sensor and the defective sensor can thus be detected or identified more reliably.

Further preferred, the sensor codes of the predetermined positions of the code carrier provided for detecting selector lever positions also have a Hamming distance of at least two to the sensor codes, each consisting of identical sensor signals. The sensor codes that consist of identical sensor signals each can be used for the sensor device so that a sensor code can be issued by the sensor device in case of an error other than a sensor error, which consists exclusively of identical sensor signals like "0" or "1", for example. Such an error may signalize a short in the supply voltage of the sensors or an interruption of the mass of the sensors. The sensor device can thus be used to provide another diagnostic option with regard to an error within the sensor device beside recognizing and determining a faulty sensor. The sensor device can preferably have a sensor code output unit or be coupled with such, which is configured to issue the sensor codes formed from the sensor signals of the sensors, whereas the sensor code output unit is further designed to issue a sensor code consisting of identical sensor signals, if an error occurs as described in an exemplary manner above or if an error other than a sensor error occurs. The sensor code output unit can alternatively be combined with an evaluator, which is or can be coupled with the sensor device or which is assigned to the sensor device.

According to one preferred embodiment, the sensor device comprises six sensors, wherein the encodings of the coding areas from the code carrier and the six sensors are also provided in such a way that the sensor codes from the predetermined positions of the code carrier intended to detect selector lever positions have a Hamming distance of at least three among each other and further preferred, have a Hamming distance of at least two to the sensor codes, which consist of identical sensor signals each. Besides the advantages described above, it can furthermore be ensured that double faults can be noticed and that single faults can be corrected. A distinctiveness of the individual sensor codes intended to detect the selector lever positions in particular can furthermore be increased.

Further preferred, the encodings of the coding areas from the code carrier and the six sensors are also provided in such a way that a third sensor code to be provided has a Hamming distance of four on a third predetermined position of the code carrier at least to the first sensor code, whereas the further position and the third predetermined position of the code carrier in the selection sequence based on the initial position of the code carrier usually then follows the initial position. In other words, during a position change of the code carrier, both from the initial position to the next position and from the starting position to the third position, four of the six sensors each perform a signal change of the sensors. During a position change of the code carrier from the next position across the starting position and also vice versa, all sensors perform a signal change of the sensors, in each case. Reliable fault recognition can thus be performed in a simple way without the code carrier having to necessarily run through more than three different positions.

According to one preferred embodiment, the code carrier has several coding area groups each with a coding area per track, where the coding area groups are arranged successively along a joint axis of extension of the at least two tracks. The joint axis of extension of the at least two tracks consists of the respective axes of extension from the individual tracks. Preferably, the respective axes of extension of the individual tracks run parallel or approximately parallel to each other. Approximately parallel is to be understood as two axial courses that run in at least one equal direction, however can have a different progressive form in single or several course sections of the axis. Preferably, the entire axis of extension of the at least two tracks is aligned to a motion axis of the code carrier. Further preferred, the joint axis of extension of the at least two tracks runs parallel or approximately parallel to the motion axis of the code carrier. The respective axis of extension of one track preferably also runs parallel or approximately parallel to the motion axis of the code carrier. A constructively simple arrangement of the sensors to the code carrier as well as the code carrier on the selector lever can thus be chosen, which besides the constructive simplification results in further cost savings when designing the sensor device.

A total number of coding area groups moreover consists of at least a minimum number of coding area groups to detect one of the positions of the code carrier to be detected and a number of further coding area groups, which is equal to a number of a number exceeding a position to be detected on other positions of the code carrier to be detected. The minimum number of coding area groups to detect a position of the code carrier to be detected is three with a two-track code carrier. If two more positions of the code carrier are to be detected, for instance, the total number of coding area groups is five. If four further positions of the code carrier are to be detected beside the one position, the total number of coding area groups is seven. This will ensure that the code carrier has a sufficient number of coding area groups to be able to detect each position of a predetermined number of positions of the code carrier to be detected. The predetermined number of positions to be detected is preferably equal to the number of the selector lever positions to be detected.

It is further preferred if the code carrier has two tracks and a first and second coding area group, which follow each other along the axis of extension and have coding areas with the same coding each, wherein the coding areas of the first coding area group have a coding that is different from the coding areas of the second coding area group. Accordingly, the coding areas of the first coding area group can have a first coding or identical coding, each and the coding areas of the second coding area group can have a second coding or identical coding each, whereas the second coding varies or is different from the first coding.

The code carrier furthermore has a third coding area group that follows along the axis of extension of the first or second coding area group, whereas the third coding area group has coding areas with a coding different from each other, of which one is identical to the coding of the coding area group and the other is identical to the coding of the second coding area group. In other words, the at least third coding area group has a coding area with the first coding and another coding area with the second coding, the one coding area being arranged in one of the two tracks, and the other coding area being arranged in the other track.

At least two sensors of the at least four sensors are furthermore situated across from each track in the starting position of the code carrier such that two coding areas can be read out from the outer coding area group comprising coding areas with equal coding, and that equally coded coding areas can be read out from the coding areas of the other coding area groups.

The sensor device according to this preferred embodiment is designed simple and compact in terms of construction, wherein the embodiment of the code carrier is designed with two tracks, the distribution of the coding areas is designed in the respective tracks, and the arrangement of the sensors to the code carrier is designed for a variable number of sensors, wherein the variable number of sensors can be four or six. A sensor device can thus be provided, which can optionally be equipped with four or six sensors depending on the requirement on the sensor device without having to perform changes on the code carrier or having to replace the code carrier.

According to an alternate preferred embodiment, the code carrier has three tracks and a first and second coding area group, each comprising two adjacent first coding areas with the same coding and a second coding area adjacent to one of the first coding areas each, with a coding different from the respective first coding area, whereas the coding of the first coding areas from the first coding area group differs from a coding of the first coding areas of the second coding area group. Preferably, the coding of the first coding areas from the first coding area group is a first coding, such as a magnetic north pole, and the coding of the second coding area from the first coding area group is a second coding, such as a magnetic south pole, whereas the encodings of the first and second coding areas from the second coding area group are coded in reverse. The first coding areas of the first coding area group are arranged adjacent to the first coding areas of the second coding area group and the second coding area of the first coding area group is arranged adjacent to the second coding area of the second coding area group. In the starting position, three sensors of the at least four sensors of the first coding area group and one sensor of the at least four sensors are furthermore located across from a centered first coding area of the second coding area group.

In contrast to the previously described preferred embodiment, the sensor device has a code carrier with three tracks, where, besides the previously described advantages, a more compact design is enabled in the direction of motion of the sensor device. Because a minimum number of coding area groups to detect one of the positions of the code carrier to be detected is only two in this case. Due to the variable arrangement of the sensors in combination with a two or three-track code carrier, a sensor device can be provided that can fulfill different assembly space requirements.

According to one of the two embodiments alternatively described above, the sensor device furthermore preferably has six sensors that are arranged in the starting position of the code carrier such that the encodings of all coding areas of the respective first and second or first to third coding area group can be read out. The previously described advantages can thus be achieved with regard to six sensors.

According to another aspect of the present disclosure, a selector lever device is proposed for a motor vehicle, the selector lever device comprising a selector lever that is movable between different selector lever positions, a code carrier of a sensor device being fixated on the selector lever detachable, in particular, in accordance with one of the previously listed preferred embodiments. As described above, the selector lever device can be a control stalk or a gear selection lever, which is designed monostable or bistable. A selector lever device can thus be provided to reliably detect a position of the selector lever and to detect possible defects of one of the sensors used for detecting the selector lever.

The selector lever is preferably designed monostable, wherein a first selector lever position corresponds to the starting position of the code carrier and is a stable selector lever position that the selector lever can be reset to automatically from at least a second selector lever position, which is an unstable selector lever position, and which corresponds to one of the other positions of the code carrier. Such monostable selector levels are generally well-known. But by combining the stable selector lever position with the starting position of the code carrier, it can be ensured that a possible defect of a sensor is already noticeable at the start of operation of the selector lever device, whereby a safe condition can be set in case of defect. A safety of the selector lever device can thus be increased.

According to one preferred embodiment, the sensor device or the selector lever device can comprise an evaluator designed to receive and evaluate the sensor signals and supplementary or alternatively the signal code to determine a position of the code carrier with respect to the sensors. The evaluator may comprise evaluation electronics. The evaluation electronics can be an electrical device designed to process sensor signals and to emit control signals depending on these. The evaluator can comprise one or several suitable interfaces that can be designed with hardware and or software. In case of a hardware design, the interfaces can be part of an integrated circuit, for example, in which functions of the evaluator are implemented. The interfaces can also be own integrated circuits or can consist of discrete components at least in part. In case of a software design, the interfaces can be software modules that exist on a microcontroller beside other software modules, for example.

The concept introduced with certain described embodiments offers many advantages. It can be transferred to different sensor types such as optical, magnetic, inductive, or capacitive ones. The idea underlying the approach presented here considers the detection of sensor errors by means of a Hamming distance between all positions to be detected in order to also use the system in security-related systems standard-compliant with ISO 26262 and IEC 61508. This means that each position of the code carrier or the selector lever read out by the control logic can differ from any other position by means of at least two entries or codes in the sensor code or sensor word. A single sensor defect can thus always be recognized.

Detecting an absolute position of the code carrier or the selector is furthermore done with of the sensor device, whereby a jumping of the code carrier or of the selector lever can be recognized. A jumping is to be understood as such a fast movement of the code carrier or the selector lever at least across an adjoining position into another position so that the sensor device cannot detect the passage of the code carrier or the selector lever through the at least one adjoining position. The interpretation of the suggested sensor device as an absolute position detecting device additionally allows to reliably detect a current or actual position of the code carrier or the selector lever also after an intermediate current-free state of the sensor device, in which a position of the code carrier or the selector lever can absolutely be changed.

BRIEF DESCRIPTION OF THE DRAWINGS

The embodiments of the present disclosure are now described in detail below by means of the enclosed drawings. The following is shown:

FIG. 5 shows a sensor code table of a sensor device according to one embodiment;

FIG. 6 shows a Hamming distance table of a sensor device according to an embodiment with four sensors; and FIG. 7 shows a Hamming distance table of a sensor device according to an embodiment with six sensors.

DETAILED DESCRIPTION

Figure 1:
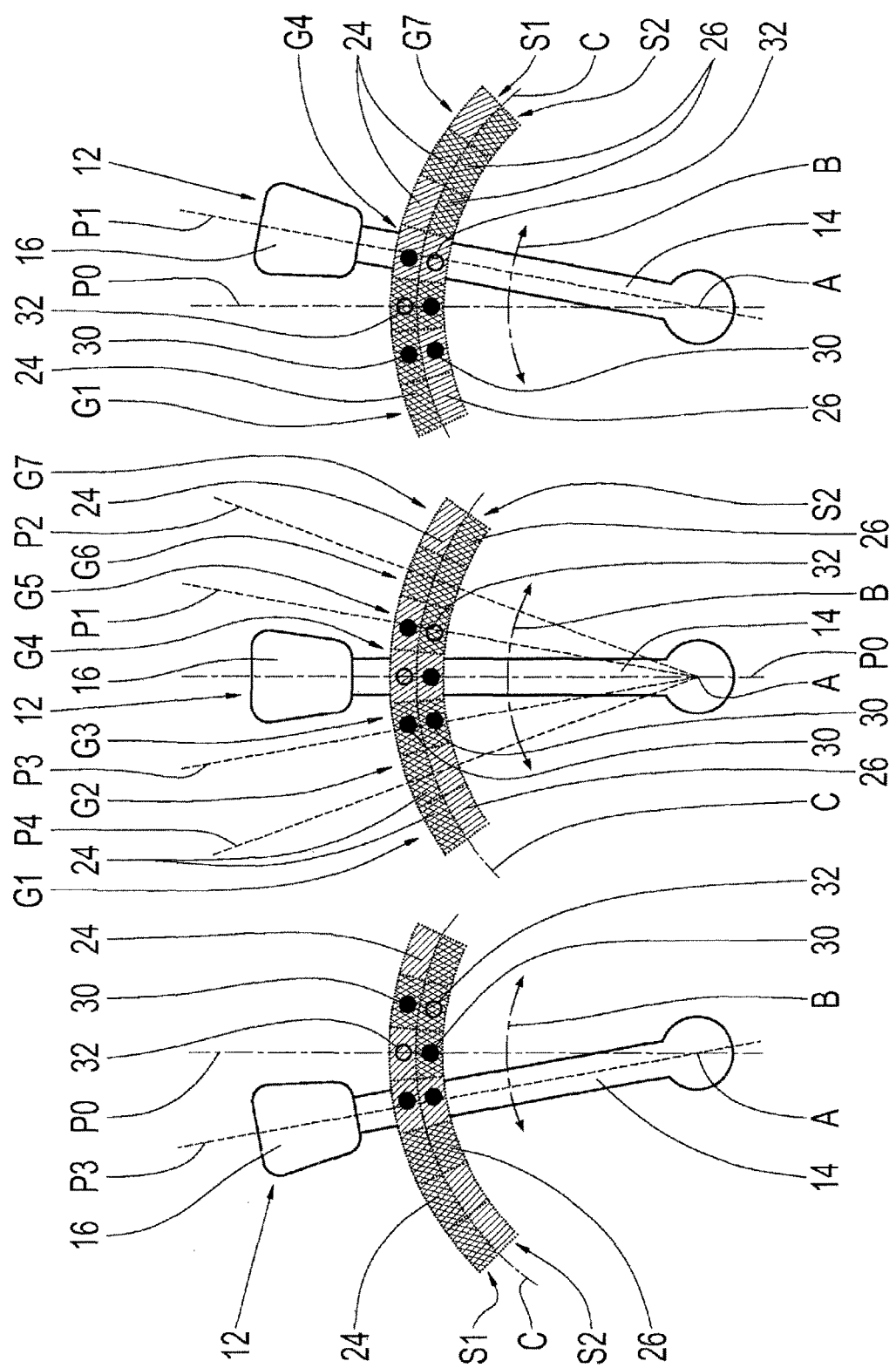
FIGS. 1A to 1C show diagrams of a selector lever device with a sensor device according to one embodiment.

In the following description of preferred embodiments from the present disclosure, the same or similar reference signs are used for the elements with similar effects represented in the different figures, wherein a repeated description of these elements will be waived.

FIGS. 1A to 1C show diagrams of a selector lever device 10 with a sensor device 20 according to one embodiment. The selector lever device 10 comprises a swivel-mounted selector lever 12, which comprises a selector lever rod 14 pivoted around an axis of rotation A and a selector lever knob 16, which is attached to a front end of the selector lever rod 14. The selector lever 12 is movable between five different selector lever positions P0, P1, P2, P3, P4 around the axis of rotation A by actuating the selector lever knob 16, where the selector lever position P0 defines a center position and the selector lever positions P2 and P4 each define an end position for the selector lever 12. According to one embodiment, the selector lever device 10 can be designed monostable and according to an alternative embodiment, it can be designed bistable, where the center position P0 in the monostable design is a stable selector lever position and the other selector lever positions P1 to P4 define an unstable selector lever position, from which the selector lever returns to the stable center position P0 automatically following release by a user.

The sensor device 20 comprises a code carrier 22 that is fixated on the selector lever 12 between the selector lever knob 16 and the rotary axis A. The code carrier 22 is moved along by the selector lever 12. The code carrier 22 is formed from a disc or plate formed like a ring-segment, whose underlying radius has its starting point in the rotary axis A. The code carrier has a circular arc-shaped curvature that runs along one motion axis B of the selector lever 12, wherein the motion axis B extends across the selector positions P0 to P4. The code carrier 22 comprises two tracks S1, S2, which extend parallel to one another and adjacent to each other along the motion axis B of the selector lever 12 or rather the code carrier 22. The tracks S1, S2 have a joint axis of extension C which is formed by a parting plane between the two tracks S1, S2. Each of the two tracks S1, S2 has several identically shaped coding areas 24, 26, each forming a partial ring segment in the ring segment-shaped code carrier 22. The respective coding areas 24; 26 of the individual tracks S1, S2 are arranged adjacent to each other along the joint axis of extension C and are arranged adjacent crosswise to one coding area 24, 26 of the respective adjacent track S1, S2 each. Two coding areas 24, 26 each divided and adjacent to each other across both tracks S1, S2 define a coding area group G1 to G7.

Each of the coding area groups G1 to G7 comprises two coding areas 24, 26 with a predetermined coding selected from two different encodings. One first coding is represented in FIGS. 1A to 1C by means of oblique hatching, in particular, and a second coding, which is different from the first coding is represented by a cross hatching. In other words, both coding areas 24, 26 shown with an oblique hatching and the coding areas 24, 26 shown with a cross hatching have a coding identical among each other.

Because of its design, the code carrier 22 has a compact form with a circular arc-shaped curvature. The code carrier 22 can easily be divided identically across the tracks S1, S2 in several identically designed coding areas 24, 26.

The sensor device 20 furthermore comprises four sensors 30 that are arranged across from the code carrier 22 so that one individual sensor 30 faces a coding area 24, 26 in each of the positions P0 to P4 of the selector lever 12 or the code carrier 22. The sensor device 20 further comprises two measures 32 for the respective arranging of another sensor 30 across from one of the coding areas 24, 26, each.

Because of the previously described design of the code carrier 22, an arrangement location of the sensors 30 can be intended in an intersection between a circular arc plane, which crosses the respective assigned coding area 24, 26, and which has the rotary axis A as the center and a radius line, which crosses the respective selector lever position P0 to P4 originating from the rotary axis A as the central point. According to the embodiment shown, the sensors 30 are arranged opposite a center of an area of the respective coding areas 24, 26. The sensors 30 can be arranged on a circuit board in the usual way, which can be fastened or fixed on a housing element of the selector lever device 10. Alternatively, the selector lever device 10 or the sensor device 20 can have a sensor bracket configured to support and electrically connect the sensors 30.

The four sensors 30 are provided to read out the encodings of the coding areas 24, 26 in each of the selector lever positions P0 to P4 from three different coding area groups and to provide them as a sensor signal to be able to detect the selector lever position.

The code carrier 22 has a number of coding area groups G1 to G7, which consists of a number of coding area groups G3 to G5 for detecting a first selector lever position P0 and a number of more coding area groups G1, G2, G6, G7, which resembles a number of further selector lever positions P1 to P4 to be detected exceeding the first lever position P0 to be detected. In terms of the embodiment shown in FIGS. 1A to 1C, the coding areas 24, 26 of three coding area groups G3 to G5 are required to detect the selector lever position P0 by means of four sensors, the selector lever 12 in four more selector lever positions P1 to P4 being movable. The coding areas 24, 26 of a total of seven coding area groups G1 to G7 is required to detect the five selector lever positions P0 to P4 of the selector lever device 10.

Figure 2:
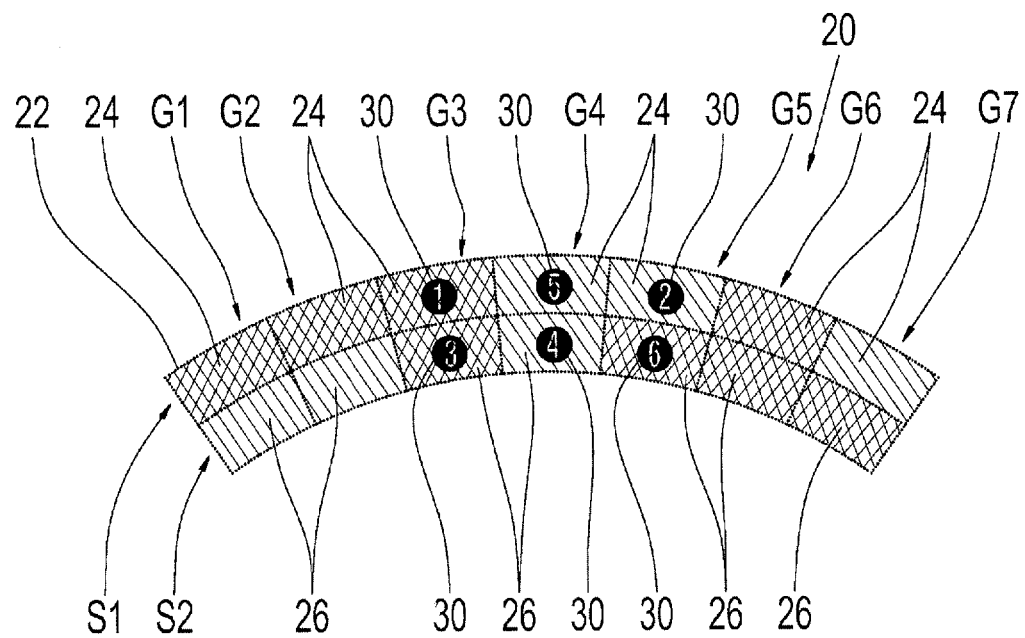
FIG. 2 shows a diagram of a sensor device of the selector lever device shown in FIGS. 1A to 1C.

FIG. 2 shows a diagram of the sensor device 20 of the selector lever device 10 with six sensors 30 shown in FIGS. 1A to 1C. The code carrier 22 is in a starting position, which corresponds to the selector lever position P0 shown in Fig. A. The sensors 30 are arranged so that they face all coding areas 24, 26 of three coding area groups when in the respective selector lever positions P0 to P4 to read out the respective coding of the coding areas 24, 26 and to be able to provide them as a sensor signal. In FIG. 2, the sensors 30 are facing the coding areas 24, 26 of the coding area groups G3 to G5 to detect the selector lever position P0. FIG. 2 shows an example of a sequence for a sensor signal output to generate a signal code. The portrayed sequence is however not mandatory and can be freely selected for a sensor device 20 with both four sensors 30 and six sensors 30 in the previously described arrangement without the sensor device 20 being restricted in its effective function.

Figure 3:
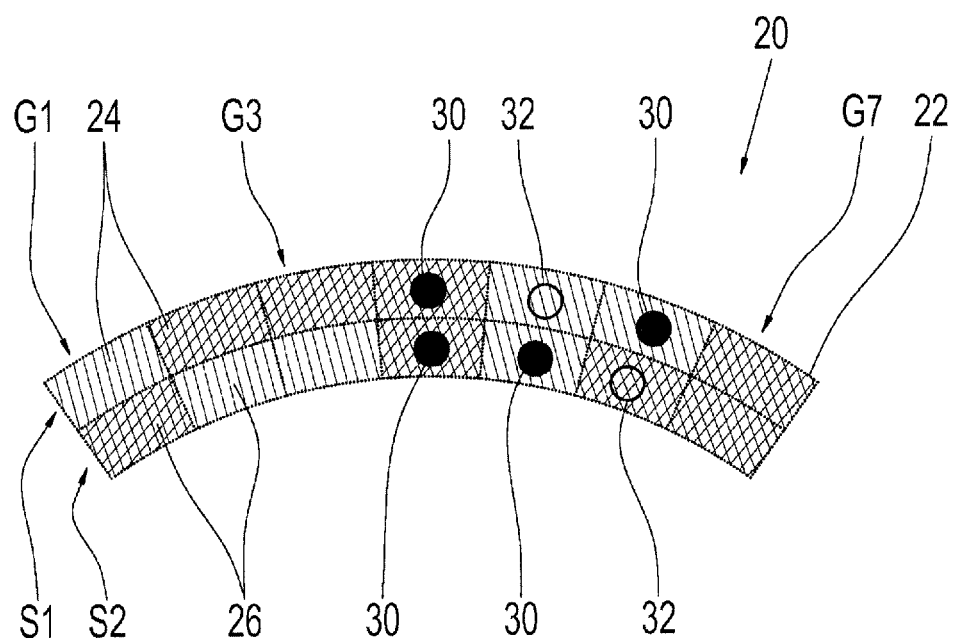
FIG. 3 shows a diagram of a sensor device according to another embodiment.

FIG. 3 shows a diagram of a sensor device 20 according to another embodiment. The sensor device 20 according to this embodiment differs from the previously described embodiment by the arrangement of the sensors 30 to the code carrier 22 or the coding areas 24, 26 in the starting position of the code carrier 22 or the selector lever 12. In contrast to the previously described embodiment, based from the starting position of the code carrier 22 along a direction of movement, only one further position can be detected by means of the sensor device 20, and three further positions can be detected along an opposite direction of movement. Such an arrangement is especially suited to detect selector lever positions of a selector lever which, based on a starting position along one direction of movement, can assume one further selector lever position, and along an opposite direction of movement can assume three further selector lever positions. The sensor device 20 according to this embodiment can also comprise four or six sensors 30, which can be arranged as described above in terms of their arrangement to the coding areas 24, 26 of the coding carrier 22. A sequence of the sensor signal output of the sensors can also be freely chosen.

Figure 4A:
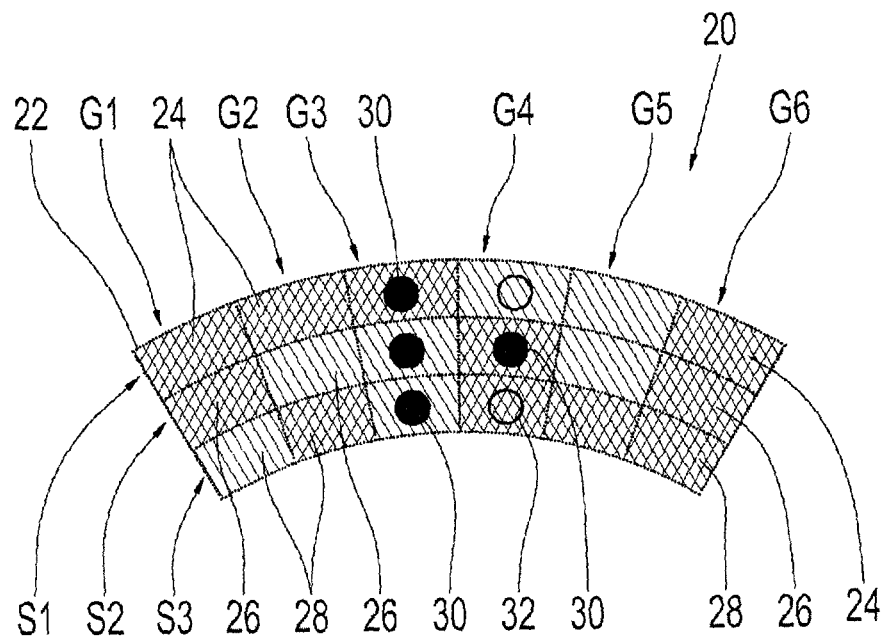
FIG. 4A shows a diagram of a sensor device according to another embodiment.
Figure 4B:
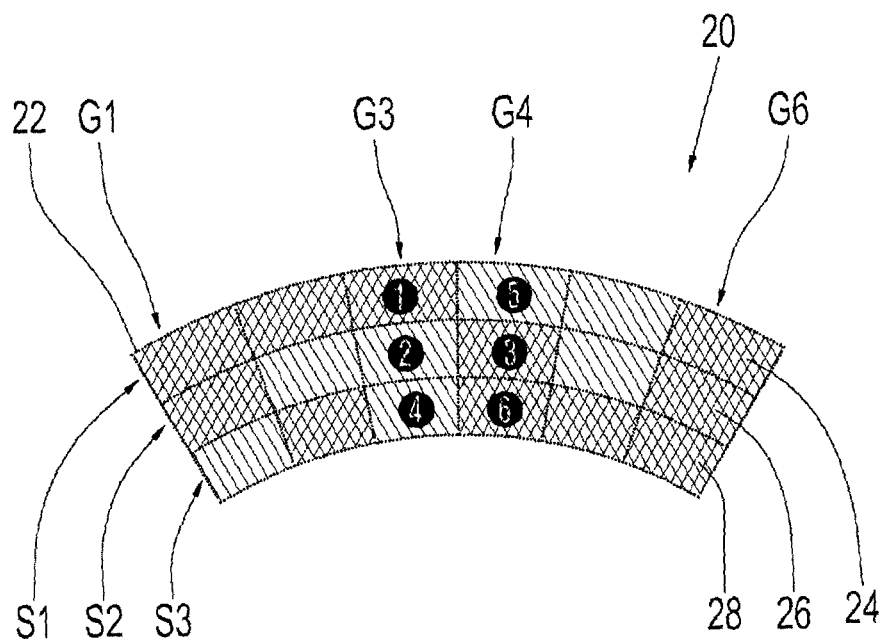
FIG. 4B shows a diagram of a sensor device according to another embodiment.

FIG. 4A shows a diagram of a sensor device 20 according to another embodiment, the sensor device 20 comprising four sensors 30 and having two measures 32 for arranging one more sensor 30 each. FIG. 4b shows a diagram of the sensor device 20 from FIG. 4A with six sensors 30. The sensor device 20 according to these embodiments differs from the previously described embodiments in the design of the code carrier 22 and the arrangement of the sensors 30 to the coding areas of the code carrier 22. The code carrier 22 according to this embodiment is essentially identical to the two-track code carrier 22 of the previously described embodiments with the only difference that the code carrier 22 according to this embodiment has three tracks S1, S2, S3, and for each track, has a lower number of coding areas 24, 26, 28 and thus comprises an overall lower number of coding area groups G1 to G6. The number of the coding area groups G1 to G6 required to detect a selector lever position however still follows the rule described in connection with the two-track code carrier. The code carrier 22 according to this embodiment is equally suited to detect the five selector lever positions P0 to P4 of the selector lever device 10 shown in FIGS. 1A to 1C. Four sensors 30 are arranged opposite the code carrier 22 in the starting position of the code carrier such that the encodings of the coding areas 24, 26, 28 of a coding area group G3 and the coding of the center coding are 26 of an adjacent coding area group G4 are read out by the four sensors 30 and are each provided as a sensor signal, wherein the sensor signals can be combined to a sensor code. The sensor device 20 also has the option to expand the sensor device 20 with two more sensors 30. According to FIG. 4B, the two other sensors 30 can be arranged opposite the coding areas 24, 26, 28 of the code carrier 22 such that all encodings of the coding areas 24, 26, 28 of two adjacent coding area groups can be read out from the six coding area groups G1 to G1 in each of the selector lever positions P0 to P4 and can be provided as a sensor signal each.

FIG. 5 shows a sensor code table of a sensor device 20 according to one of the previously described embodiment for a selector lever device 10 as shown in FIGS. 1A to 1C. The respective sensor codes for the respective selector lever positions P0 to P4 are the result of the predetermined coding described as an example above and a different second coding. The sensor device 20 is configured to depict a sensor signal 20 assigned to the first coding, represented by an oblique hatching in the respective coding areas 24, 26, 28 of the FIGS. 1A to 4B with a "1", and to depict a sensor signal assigned to the second coding, represented by a cross hatching in the respective coding areas 24, 26, 28 of the FIGS. 1A to 4B with a "0", and to generate a signal code or signal word consisting of "0" and "1" from the sensor signals of the sensors 30. A unique signal code can thus be assigned to each of the selector lever positions P0 to P4 by means of which the selector lever positions assumed by the selector lever 12 can be determined. As can be seen from the table, two further signal codes "all 0" and "all 1" are provided, which are composed of identical sensor signals "0" or "1" each, and which can be used for the diagnosis of the sensor device. For instance, an individual defect affecting all sensors such as a short circuit to earth or for the supply voltage can be represented by one of these signal codes. This is based on the prerequisite that the signal codes each assigned to a position to be detected also have a Hamming distance of at least two to these signal codes showing the individual defect.

FIG. 6 shows a Hamming distance table for a sensor device 20 according to a previously described embodiment, where the sensor device 20 comprises four sensors 30. As can be seen from the table shown and the table in FIG. 5, the predetermined arrangement of the four sensors 30 in connection with the predetermined design of the code carrier 22 optionally with two or three tracks S1, S2, S3 enables an assignment of signal codes to the selector lever positions P0 to P4 to be detected so that each signal code to be assigned to a selector lever position at least has a Hamming distance of two to another signal code to be assigned to a signal lever position. The signal code "0101" assigned to a starting position P0 of the code carrier 22 or the selector lever 12 furthermore has a Hamming distance of four to a signal code "1010" assigned to a subsequent selector lever position P1 following the selector lever position P0 to P4 in the order of selection. In other words, during a position change of the code carrier 22 or the selector lever 12, all four sensors 30 perform a signal change from the starting position P0 to the next position P1. A sensor fault can thus be detected reliably. From a perspective of functional safety, this makes a warning and possibly a switch of a provided device to a safe condition possible.

These advantages can also be achieved with a sensor device 20 with six sensors 30. FIG. 7 shows a Hamming distance table of a sensor device 20 with six sensors 30 according to a previously described embodiment for a selector lever device 10 as shown in FIGS. 1A to 1C. As shown both in the depicted table and the table in FIG. 5, the predetermined arrangement of the six sensors 30 in connection with the predetermined design of the code carrier 22 optionally with two or three tracks S1, S2, S3 enables an assignment of signal codes to the selector lever positions P0 to P4 to be detected in such a way that each signal code assignable to a selector lever position has a Hamming distance of three to another signal code assignable to a selector lever position. Both a more reliable fault detection of single and double faults and a correction of single faults can thus be enabled. The signal codes assigned to the selector lever positions P1, P3, which follow the starting position P0 in the order of selection each and which thus include it, furthermore have a Hamming distance of four to the signal code assigned to the starting position P0, wherein all six of the sensors 30 run through a signal change during a complete change of positions of the code carrier 22 or the selector lever between the two selector lever positions P1, P3 and the starting position. Three selector levers are thus enough in order to recognize a fault in one of the six sensors 30.

The code carrier 22 described above can be realized in various ways in reference to its coding sequence. For example, an optimal coding of the respective coding area groups G1 to G7 can be realized with the two-track code carrier 22 shown by means of FIGS. 1A to 2 in such a way that the three coding area groups G3 to G5 consist of two coding area groups G3, G4 with coding areas 24, 26, which are coded identically to one another, whereby the two coding area groups G3, G4 differ in their coding to one another and the third coding area group G5 with coding areas 24, 26 which are coded differently from one another in order to detect the starting position.

The third coding area group G5 is first followed along a direction of extension of the two tracks S1, S2 by another coding area group G6 with coding areas 24, 26, which has a coding identical to the coding areas 24, 26 of the outer coding area group G3 from the three coding area groups G3 to G5 to detect the initial position. Another coding area group G7 then joins with coding areas 24, 26, whereby the coding area group G7 is constructed identical to the third coding area group G5.

Adjacent to the outer coding area group G3, two other coding area groups G1, G2 are arranged in the direction opposing the direction of extension, which are constructed identical to one another and which have coding areas 24, 26 with a different coding, wherein the coding sequence of the coding areas 24, 26 is reverse to the coding sequence of the third coding area group G5.

The design of the code carrier 22 shown with FIG. 3 according to another embodiment differs from the previously described code carrier 22 by that the coding of the coding area groups G1 to G7 was displaced in such a way that an outer coding area group G7 with a design identical to the third coding area group G5 was displaced along the axis of extension of the code carrier 22 from one side of the code carrier 22 to the other side of the code carrier 22.

The design of the two-track code carrier 22 is chosen as an example in terms of its coding. The code carrier 22 can absolutely be designed differently with regard to a coding of its coding areas 24, 26. What is essential is that the two-track code carrier 22 has a signal code for a starting position of the code carrier 22 or the selector leer 12 which has a Hamming distance of four to a signal code for a position of the code carrier 22 or the selector lever 12, wherein this position then follows in the sequence of the positions from the starting position to be detected.

The three-track code-carrier 22 shown with FIGS. 4A and 4B according to another embodiment has such a structure in terms of its coding, so that all coding area groups G1 to G6 have a coding sequence differing from one another. The coding area groups G1 to G5 thereby each comprise two coding areas with a coding that is identical to one another and a third coding area with a coding that is different from the identical encodings, wherein the coding sequence of the coding areas 24, 26, 28 of the coding area groups G1 to G5 is different from one another. The outer coding area group G6 however comprises three coding areas with a coding identical to one another.

The design of the three-track code carrier 22 is also chosen by way of example. What is essential for the coding structure of the three-track code carrier 22 is that a signal code for a starting position of the code carrier 22 or the selector lever 12 has a Hamming distance of four each to signal codes of positions of the code carrier or the selector lever 12, which follow the starting position each in the sequence of the positions to be detected and which include the starting position in the order of selection, or rather where the starting position is intended between these positions in the order of selection.

The encodings of the two and three-track code carriers 22 can be realized in different ways. For example, according to one embodiment, encodings differing from each other can be realized by means of a magnetic or magnetizable code carrier, whose coding areas have a coding with a magnetic or magnetized North Pole characteristic and another coding with a magnetic or magnetized South Pole characteristic. Alternatively to the North Pole or South Pole characteristic, one of the encodings can be realized through a non-magnetized area, in which the respective coding area forms an empty area or which is formed by a diamagnetic material ($\mu r<1$) such as copper. According to another embodiment, the encodings can be realized optically according to the transmitted light principle, wherein a coding can be realized by means of an absorbent black surface in one coding area and another coding by means of a reflective white surface in another coding area. Alternatively, according to another embodiment, the encodings can be realized according to the transmitted light principle, wherein one coding is realized by means of a light-absorbing black surface and another coding by means of a translucent area in another coding area. According to another embodiment, the encodings can be done based on induction, wherein respective coding areas of the code carrier are designed from materials with a predetermined permeability or from a combination of gaps and materials with a predetermined permeability. Two or several discrete initial states can thus be realized in a simple manner. According to another embodiment, the encodings can take place on a capacitive basis, wherein the code carrier is composed of coding areas, which are formed from materials with a high dielectric constant for realizing a coding and from materials with a low dielectric constant for realizing another coding. According to another embodiment, the encodings can be realized through a combination of the previously described principles. To detect the respective coding, the appropriate sensors must be used. For example, Hall sensors can be used for encodings on a magnetic or magnetized basis. Optical couplers may be considered for encodings on an optical basis. Inductive or capacitive sensors may be used for encodings on an inductive or capacitive basis accordingly.

The embodiments described and shown in the figures are only selected in an exemplary manner. Different embodiments can be combined with each other completely or in reference to individual features. An embodiment may also be supplemented by features from another embodiment.

If an embodiment comprises an "and/or" connection between a first feature and a second feature, then this may be read as that the embodiment according to one embodiment comprises both the first and the second feature and according to another embodiment comprises either only the first feature or only the second feature.

REFERENCE SIGNS

10 Selector lever device
12 Selector lever
14 Selector lever rod
16 Selector lever knob
20 Sensor device
22 Code carrier
24, 26, 28 Coding area
30 Sensors
32 Measure for arranging a sensor
G1, G2, G3,
G4, G5, G6,
G7 Coding area group
P0, P1, P2,
P3, P4 Selector lever position
S1, S2, S3 Track
A Rotary axis
B Motion axis of the selector lever
C Axis of extension of the track

I claim:

1. A sensor device for detecting positions of a selector lever, the sensor device comprising:
at least four sensors; and
a code carrier arranged such that each of the four sensors faces the code carrier, the code carrier being movable through at least four positions with respect to the at least four sensors, and the code carrier comprising:
a plurality of coding areas each having a encoding, where at least one coding area is faced by each sensor of the at least four sensors when the code carrier is in each of the at least four predetermined positions,
wherein each sensor of the at least four sensors is configured to read the encoding of the respective coding area such that a sensor code is formed, the sensor code corresponding to the position of the code carrier;

wherein the code carrier is distributed on at least two tracks extending parallel to one another, and wherein the at least four sensors and the coding areas are arranged such that a first sensor code, which is assigned to a starting position of the code carrier, has a Hamming distance of four with respect to a second sensor code, wherein the second sensor code is assigned to a second position of the code carrier that is sequential with respect to the starting position.

2. The sensor device according to claim 1, wherein the sensor device has exactly four sensors for reading encodings, and wherein the encodings of the coding areas and the four sensors are arranged such that each of the sensor codes corresponding to each of the positions of the code carrier and sensor codes consisting of identical sensor signals have a respective Hamming distance of at least two.

3. The sensor device according to claim 1, wherein the at least four sensors comprises six sensors, wherein the encodings of the coding areas of the coding carrier and the six sensors are arranged such that the each of the sensor codes corresponding to each of the positions of the code carrier have a Hamming distance of at least three with respect to each other, and have a Hamming distance of at least two with respect to sensor codes consisting of identical sensor signals.

4. The sensor device according to claim 3, wherein the encodings of the coding areas of the code carrier and the six sensors are further arranged such that a third sensor code corresponding to on a third position of the code carrier has a Hamming distance of at least four with respect to the first sensor code, the third position being sequential with respect to the second position.

5. The sensor device according to claim 1, wherein the code carrier has a plurality of coding area groups each with a coding area per track, wherein the coding area groups are arranged successively along an axis of extension of the at least two tracks, and wherein a total number of coding area groups comprises at least a minimum number of coding area groups for detecting a position of the code carrier plus a number of coding area groups equal to the number of positions exceeding the starting position.

6. The sensor device according to claim 5, wherein the code carrier has two tracks with a first coding area group, a second coding area group, and a third coding area group, wherein the two tracks follow each other along the axis of extension, wherein the coding areas of the first coding area group have a coding that is different from the coding areas of the second coding area group, wherein the third coding area group has coding areas with a different coding that is different than the respective coding areas of the first and second coding area groups, where at least two sensors of the at least four sensors are arranged facing each track in a starting position of the code carrier in such a way that two coding areas, with the same encoding, can be read out from the third coding area group and such that encodings of two coding areas can be read out from the coding areas of the remaining coding area groups.

7. The sensor device according to claim 5, wherein the code carrier has three tracks with a first coding area group and a second coding area group comprising two adjacent first coding areas with the same encoding and a second coding area with an encoding different from the encoding of the first coding areas, wherein the encoding of the first coding areas of the first coding area group is different from an encoding of the first coding areas of the second coding area group, wherein the first coding areas of the first coding area group are arranged adjacent to the first coding areas of the second coding area group and the second coding areas of the first coding areas group are arranged adjacent to the second coding area of the second coding area group, wherein three sensors of the at least four sensors are arranged facing first coding areas in the starting position of the code carrier, and where a different sensor of the at least four sensors is arranged facing a centered first coding area of the second coding area group.

8. The sensor device according to claim 6, wherein the sensor device has at least six sensors arranged in such a way that the encodings of all coding areas of the respective first and second and/or the respective first to third coding area group can be read out when the code carrier is in the starting position.

9. The sensor device according to claim 1, wherein the code carrier is formed by a magnetized and/or magnetizable disc, and wherein an encoding is read by recognizing different magnetization of the respective coding areas.

10. The sensor device of claim 1, wherein an encoding is read by recognizing that it is the same or different than a predetermined encoding.

11. The sensor device of claim 1, wherein the code carrier is formed by a ring segment-type disc.

12. A selector lever device comprising:
a selector lever which is movable between a plurality of selector lever positions; and
the sensor device according to claim 1, wherein the code carrier is detachably fixated on the selector lever.

13. The selector lever according to claim 12, wherein the selector lever is a control stalk.

14. The selector lever according to claim 12, wherein the selector lever is monostable, wherein a first selector lever position, which the starting position of the code carrier, is a stable selector lever position that the selector lever can be reset to automatically from at least the second selector lever position, and wherein the second selector lever position is an unstable selector lever position.

* * * * *